(12) United States Patent
Yoon et al.

(10) Patent No.: US 7,403,505 B2
(45) Date of Patent: Jul. 22, 2008

(54) RESOURCE GRANTING IN MULTI-CARRIER CDMA SYSTEMS

(75) Inventors: Young C. Yoon, San Diego, CA (US); Patrik Nils Lundqvist, Encinitas, CA (US); Todd Ruth, Valley Center, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1050 days.

(21) Appl. No.: 10/334,500

(22) Filed: Dec. 31, 2002

(65) Prior Publication Data

US 2004/0125768 A1 Jul. 1, 2004

(51) Int. Cl.
*H04Q 7/00* (2006.01)
*H04Q 7/20* (2006.01)
*H04B 7/216* (2006.01)

(52) U.S. Cl. .................. 370/331; 370/335; 370/342; 455/436

(58) Field of Classification Search ............ 370/320, 370/335, 342, 441, 479, 329–333; 455/436–444, 455/447–453; 709/238–242
See application file for complete search history.

(56) References Cited

U.S. PATENT DOCUMENTS

| 5,796,722 | A | 8/1998 | Kotzin et al. |
| 6,069,871 | A * | 5/2000 | Sharma et al. ............ 370/209 |
| 6,944,147 | B2 * | 9/2005 | Chheda .................... 370/342 |
| 2002/0137518 | A1 * | 9/2002 | Achour ..................... 455/447 |
| 2003/0129982 | A1 * | 7/2003 | Perini ....................... 455/442 |

FOREIGN PATENT DOCUMENTS

| EP | 1022920 A | 7/2000 |
| EP | 1134994 A1 | 9/2001 |
| WO | WO 97/44925 | 11/1997 |
| WO | WO 02069665 A | 9/2002 |

OTHER PUBLICATIONS

Tcha et al., Load analysis of the soft handoff scheme in a CDMA cellular system, Selected Areas in Communications, IEEE Journal on vol. 19, Issue 6, Jun. 2001, pp. 1147-1152.*

(Continued)

*Primary Examiner*—Chi H. Pham
*Assistant Examiner*—Tri H Phan
(74) *Attorney, Agent, or Firm*—Coats & Bennett, P.L.L.C.

(57) ABSTRACT

In one embodiment, a multi-carrier CDMA network grants radio link resources to a mobile station by maximizing soft handoff conditions, by preserving frequency continuity with the mobile station, or by load balancing across carrier frequencies in two or more cells, or by some combination thereof. The network identifies carrier frequencies having two or more CDMA channels for assignment to the mobile station. If one of those frequencies was used by the mobile station to request resources, it may be advantageous to select that frequency; otherwise or instead, the choice is narrowed to the carrier frequency or frequencies having the greatest number of available radio links. From that point, the choice may be further narrowed, for example, by selecting the carrier frequency having the most favorable CDMA channel loading across two or more cells. In another embodiment, such multi-carrier load balancing is the basis of carrier frequency selection.

55 Claims, 7 Drawing Sheets

OTHER PUBLICATIONS

Tripathi and Sharma; Dynamic Load Balancing in a CDMA System with Mulitple Carriers; 2001; 6 pgs., Aug. 2001.

Dean and Fleming; Trunking Efficiency in Multi-Carrier CDMA Systems; 2002; 5 pgs., Jan. 2002.

Dean, Fleming and Stolyar; Estimates of Multicarrier CDMA System Capacity; 1998; 9 pgs., Dec. 1998.

Song, Kim and Oh; Performance Analysis of Channel Assignment Methods for Multiple Carrier CDMA Cellular Systems; 1999; 6pgs., Feb. 1999.

Allen He; Performance Comparison of Load Balancing Methods in Multiple Carrier CDMA Systems; 2000; 7 pgs., May 2000.

Allen He; Trunking Efficiency for Multiple-carrier CDMA Systems; 2000; 8 pgs., Sep. 2000.

\* cited by examiner

RESOURCE GRANTING IN MULTI-CARRIER CDMA SYSTEMS

BACKGROUND OF THE INVENTION

The present invention generally relates to resource allocation in a wireless communication network, and particularly relates to efficient resource allocation for user admission, such as at call origination or at hard handoff.

Finite communication resources constrain the number of mobile stations and other wireless communication devices (users) that may be supported within a given service area. For example, within a defined service area (cell), the typical Code Division Multiple Access (CDMA) network uses at least one "CDMA channel." In this context, a CDMA channel represents the collection of forward and reverse communication links between the network and the users on a particular carrier frequency. Thus, the CDMA channel may be thought of as the "intersection" between a particular CDMA carrier and a particular cell.

On the forward link, the CDMA channel's capacity is constrained by, among other things, available transmit power and available spreading code resources. Users are added to the CDMA channel by allocating dynamically changing portions of the total forward link transmit power, and further by allocating one or more spreading codes to code-multiplex each user's individual traffic stream(s) onto the CDMA channel. Thus, the ability to allocate one or more "radio links" to a particular user on a particular CDMA channel depends on the availability of power and code resources for that channel.

Increasing the number of CDMA channels available within a particular cell substantially increases the number of users that can be supported within the cell. The use of multiple carrier frequencies enables the use of two or more CDMA channels within a particular cell. For example, the use of carrier frequencies F1 and F2 in a particular cell provides one CDMA channel in frequency F1 and another CDMA channel in frequency F2 for that cell. As a point of increased flexibility, not all cells necessarily offer multiple carrier frequencies. For example, certain cells, such as cells in a downtown urban area, may operate with two or more carrier frequencies, while outlying cells might operate with only one carrier frequency. Generally, the mix of single and multi-carrier cells within a plurality of cells may be tailored as needed or desired to meet capacity and connection reliability targets.

Even with the use of multiple carrier frequencies, the ability to efficiently utilize the added capacity and do so reliably from the perspective of network users requires a more intelligent approach to resource granting than exists in current multi-carrier networks. For example, conventional multi-carrier networks may perform limited inter-carrier load balancing such that users admitted into a particular cell are more or less assigned to the least loaded carrier frequency in that cell. However, since those users may be served in soft handoff from neighboring cells, the relative carrier frequency loading in that one cell may indicate little or nothing about the relative carrier frequency loading across the cells that will or might be used to support the mobile station.

Moreover, without considering the availability of radio links across multiple CDMA channels, the conventional networks forfeit the opportunity to increase service reliability by not granting resources on the carrier frequency that maximizes soft handoff for the mobile station or at least selecting the carrier frequency that satisfies a minimum soft handoff criterion. For these and other reasons that will become apparent, an improved method and apparatus are needed for granting resources to mobile stations in multi-carrier CDMA environments.

SUMMARY OF THE INVENTION

The present invention comprises a method and apparatus for granting radio link resources to mobile stations in a multi-carrier CDMA network, such as in an IS-2000 wireless communication network. In scenarios where two or more CDMA carrier frequencies could be used to grant radio link resources requested for a particular mobile station, the present invention provides a basis for selecting a particular carrier frequency in which to grant the requested resources. In an exemplary embodiment, the carrier frequency selection method places a priority on satisfying at least a minimum soft handoff criterion for the mobile station. In another exemplary embodiment, the carrier frequency selection method places a priority on maintaining balanced resource usage across the available carrier frequencies. Of course, the present invention contemplates carrier frequency selection based on varying combinations of these and other priorities in the several exemplary selection methods presented herein.

In general, a resource request is received from or otherwise triggered by a mobile station desiring a service connection with the network in association with, for example, call origination or hard handoff. Typically, the request explicitly or implicitly identifies one or more CDMA channels on which radio links are desired, with each of these channels associated with a particular cell in the network. While mobile stations usually request resources on a single carrier frequency, the network has knowledge of all other carrier frequencies that are available in the one or more cells associated with the resource request. Thus, the network identifies a set of one or more carrier frequencies, any one of which could be used in granting the requested radio link resources to the mobile station, and then selects a particular carrier frequency from this set to be used for granting radio link resources to the mobile station.

With emphasis on satisfying at least a minimum soft handoff criterion, the exemplary carrier frequency selection method, if possible, grants radio link resources on a carrier frequency that satisfies a minimum soft handoff criterion and preserves frequency continuity with the mobile station, or that maximizes soft handoff for the mobile station. If more than one carrier frequency maximizes soft handoff, the selection choice may be further narrowed by selecting the carrier frequency that has the best inter-cell loading condition. If more than one carrier frequency has equally best inter-cell loading conditions, the selection may be narrowed to one carrier frequency using additional selection criteria, such as by making a default frequency selection.

As an example of such carrier frequency selection, CDMA networks based on the latest IS-2000 standards (cdma2000) support Call Admission Into Soft Handoff (CASH), in which a mobile station may be granted radio link resources on two or more CDMA channels (of the same carrier frequency) in response to an origination message from the mobile station. Similar admission-into-soft-handoff processes are defined herein for mobile stations undergoing hard handoff (HHO). Thus, the admission process for both call origination and HHO may grant resources on the forward links of two or more CDMA channels such that the mobile station is admitted to the network in soft handoff (SHO), thereby gaining enhanced connection reliability through improved resistance to fading.

In the context of SHO admission, whether arising from call origination or HHO, an exemplary embodiment of the present invention first identifies the set of carrier frequencies that satisfy a minimum SHO criterion, e.g., carrier frequencies that offer two or more CDMA channels that can be used to serve the mobile station. If the resource request is associated with HHO, the network identifies the carrier frequency or frequencies that maximize SHO for the mobile station, e.g., offer the greatest number of CDMA channels in which radio links can be granted to the mobile station. If more than one such carrier frequency exists, the network further narrows the frequency choices by, for example, identifying which of these carrier frequencies has the most favorable inter-cell loading condition and/or by using other selection criteria, such as a default selection criteria.

The selection priority may be altered where the admission is associated with call origination rather than HHO of the mobile station. In this context, the mobile station transmitted an origination message or the like on a particular CDMA channel in a particular carrier frequency. Thus, by virtue of it being used by the mobile station in transmitting the origination message, that particular carrier frequency has been demonstrated as suitable for communicating with the mobile station. As such, the carrier frequency selection method is altered to first identify the set of carrier frequencies that meet the minimum SHO criterion. Then, if there is more than one such carrier frequency in the set, the network determines whether any frequency in the set was used by the mobile station for the origination message; if so, it selects that carrier frequency for granting radio link resources. This selection is referred to herein as "preserving frequency continuity" with the mobile station. If preservation of frequency continuity is not possible, the selection method attempts to maximize SHO and, if necessary, narrows the frequency selection choices using the inter-cell load balancing and/or other criteria as described above.

Note that when considering soft handoff criteria, the network considers CDMA channels in various carrier frequencies that could be used to serve the mobile station. However, when evaluating inter-cell loading across the set of carrier frequencies under consideration, the network may consider CDMA channels in one or more of those frequencies that, at least initially, will not be used to serve the mobile station. That is, the network may evaluate loading conditions on CDMA channels in cells neighboring the cell or cells where the mobile station initially will be served, neighbors of those neighboring cells, and so on.

This ability to expand inter-cell multi-carrier loading evaluation beyond the cell or cells immediately associated with serving the mobile station permits the network to balance inter-cell loading across carrier frequencies in contemplation of inter-cell movement of the mobile station movement after admission. Regardless of the particular details, evaluation of inter-cell loading across carrier frequencies allows the network to grant resources (it available) in the carrier frequency having the most favorable inter-cell loading condition and thus it tends to balance capacity utilization across the multiple carrier frequencies for a determined set (neighborhood) of cells. Such methods generally are referred to herein as "inter-cell multi-carrier load balancing."

In more detail with regard to inter-cell multi-carrier load balancing, each cell offers at least one CDMA channel for serving a plurality of mobile stations. Where the cell uses multiple carrier frequencies, it generally provides one CDMA channel per carrier frequency. Each of these CDMA channels operates with finite resources that limit the number of individual mobile stations (users) that can be served at any one time. For example, the forward link, i.e., transmissions by the network to mobile stations, in each CDMA channel is limited by the total forward link transmit power allocated to that channel. Since each user's radio link(s) on the channel consume a varying portion of the total power available, the amount of allocated power or, equivalently, the amount of remaining power, at least partially indicates the current resource loading of the channel.

Similarly, each CDMA channel has a finite number of spreading codes to code-multiplex individual information streams for the different users onto the forward link of the channel. The availability of remaining spreading codes or, equivalently, the current number of allocated codes, at least partially indicates the current resource loading of the channel. Thus, evaluation of the inter-cell loading condition of each carrier frequency amounts to assessing the power and/or code resource loading of the each CDMA channel in that frequency across some defined set of cells. To that end, the network may compute a loading metric for each CDMA channel based on power load, code usage, or some combination thereof, e.g., sum, etc. As noted, such loading evaluation may consider CDMA channels that, at least initially, will not be used to serve the mobile station. In general, the range of cells to consider beyond those that include channels on which resources will be granted may be tied to the "mobility" of the system.

Regardless, with inter-cell multi-carrier load balancing, the network generally is guided by the goal of admitting users to the network in a manner that tends to balance CDMA channel loading for each carrier frequency available in the network, or at least balance such loading across the available carrier frequencies in a particular set of cells. That is, the network grants resources to users in a manner that tends to balance CDMA channel loading across carrier frequencies in "neighborhoods" of cells. Of course, this overall goal may be modified, altered, or even overridden globally or on a selective basis, such that inter-cell multi-carrier load balancing may be practiced differently in different groups of cells within the network, or not at all in some groups of cells.

Regardless, in granting radio link resources to a particular mobile station, the network may select the set of cells considered in inter-cell multi-carrier load balancing based on, for example, information stored in the network regarding cell adjacency, etc. More dynamically, the set of cells to be considered may be determined from pilot signal reports from the mobile station, which might be included in the resource request itself. Such reports, e.g., active set reports, Radio Environment Reports, etc., identify the CDMA channels which might be used to serve the mobile station if the needed resources were available on each such channel. Thus, the network might include all of these cells, or some subset thereof, in its load balancing evaluation. In other embodiments, it might expand the cell set using current cell neighbor lists, groups of neighbor lists, etc.

As inter-cell multi-carrier load balancing represents a dynamic process subject to changing operating conditions in the network, the present invention contemplates novel inter-entity network signaling to support loading evaluations. In an exemplary embodiment, a resource or granting controller in a Base Station Controller receives periodic loading reports from one or more associated Radio Base Stations (RBSs) that indicate current transmit power availability for each cell served by the RBSs. As an alternative, or in addition to the periodic messaging, the BSC queries RBSs for cell loading information, such that the resource controller can request loading information for particular CDMA channels in particular cells as needed. Of course, other information, such as spreading code resource availability may be added to such loading reports; however, the BSC generally makes spreading code assignments and thus has a local awareness regarding spreading code availabilities in all cells under its control.

As with the load-balancing details above, the exemplary resource controller also performs carrier frequency selection based on SHO concerns, as described above, in combination with or as an alternative to the inter-cell load balancing. In that context, the resource controller receives resource requests in one form or another directly or indirectly from a mobile station desiring a connection with the network through one or more of the RBSs operating under control of the BSC. Such requests may be received by the BSC through an included RBS interface, or may be generated within the BSC responsive to some triggering message or event associated with the mobile station.

Those skilled in the art will appreciate that present invention includes various embodiments, particularly given the variety of CDMA network standards in use, and the varying Base Station System (BSS) architectures used in such networks. While the present invention is described in the following discussion with numerous references to networks based on IS-2000 standards, such descriptions should not be construed as limiting its broader applicability.

DETAILED DESCRIPTION OF THE INVENTION

Figure 1:
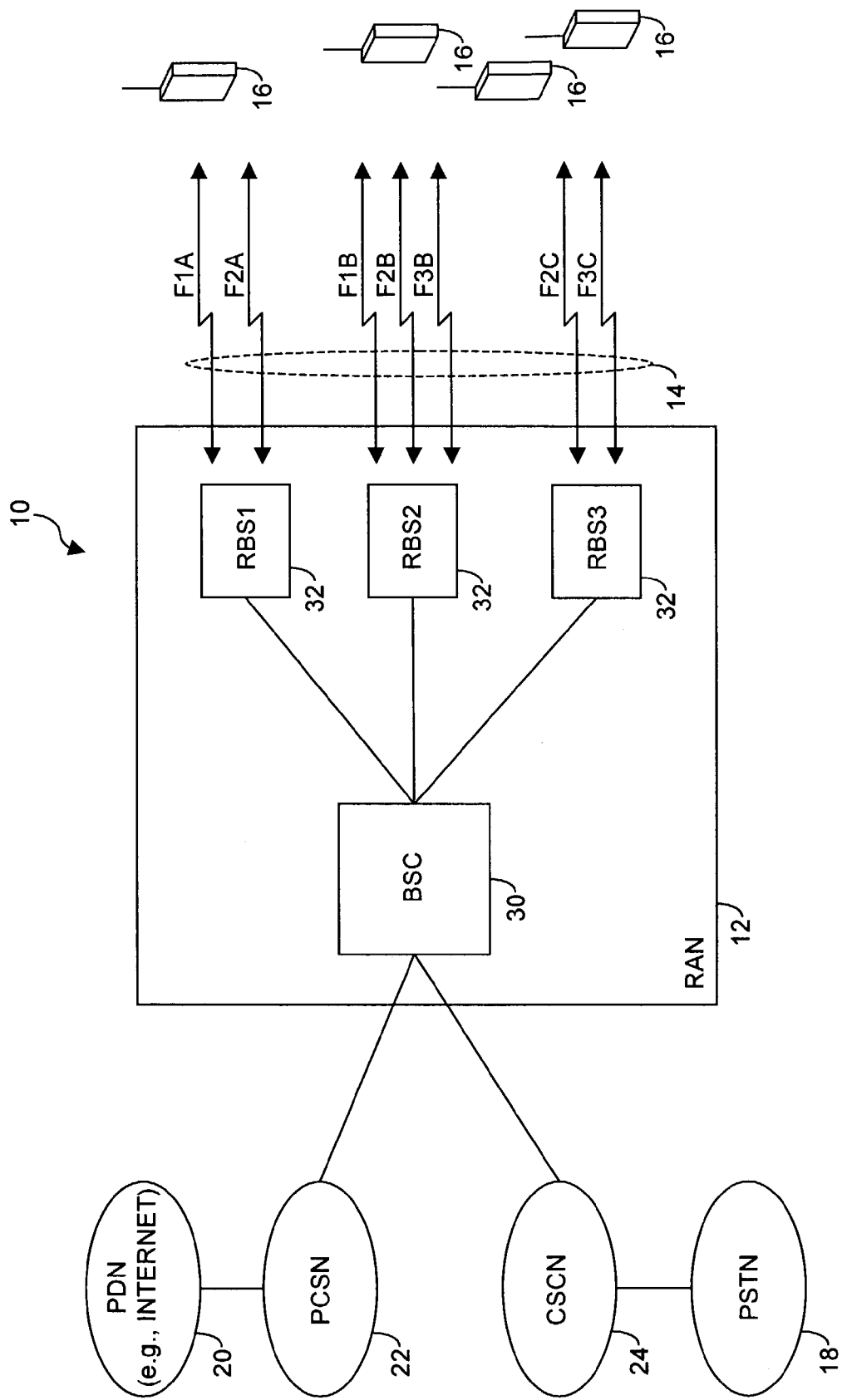
FIG. 1 is a diagram of an exemplary multi-carrier CDMA network.

FIG. 1 illustrates an exemplary wireless communication network 10, such as an IS-2000 CDMA network, comprising a Radio Access Network (RAN) 12, which provides a plurality of CDMA channels 14 for communicatively coupling a plurality of mobile stations 16 to one or more external networks, such as the Public Switched Telephone Network (PSTN) 18, and one or more Public Data Networks (PDNs) 20, such as the Internet. A Packet Switched Core Network (PSCN) 22 communicatively couples the RAN 12 to the PDN 20 and, similarly, a Circuit Switched Core Network (CSCN) 24 communicatively couples the RAN 12 to the PSTN 18. With this exemplary arrangement, network 10 provides both circuit-switched communication(e.g., voice, fax) and packet-switched communication (e.g., Web browsing, streaming media, email, etc.) to mobile stations 16.

An exemplary RAN 12 comprises one or more Base Station Controllers (BSCs) 30, with each BSC controlling one or more Radio Base Stations (RBSs) 32. In an exemplary embodiment, each BSC 30 and its associated RBSs 32 form a Base Station System (BSS), and RAN 12 may comprise a plurality of such BSSs. For each BSC 30, the RBSs 32 collectively provide a plurality of CDMA channels 14 on various CDMA carrier frequencies. The "intersection" of a particular carrier frequency and a particular service area defines a CDMA channel. Thus, if the RBS 32 serving a particular service area, referred to as a "cell" herein, transmits and receives on multiple carrier frequencies available, then a like multiple of CDMA channels are available in that cell. In the illustration, each RBS 32 operates with up to three carrier frequencies, F1, F2 and F3. Thus, as a straightforward example, a first one of the RBSs 32 (RBS1) serves Cell A (not explicitly shown) on two carrier frequencies, F1 and F2, and therefore provides two CDMA channels in Cell A. For ease of reference, a particular CDMA channel may be identified by a combination of its carrier frequency Fx and its cell identifier. With this scheme, the CDMA channel in Cell A on carrier frequency F1 is denoted as F1A, the CDMA channel on carrier frequency F2 in the same cell is denoted as F2A, and so on.

In general, each RBS 32 can (and often does) support multiple cells, and may do so using multiple carrier frequencies in each of those cells. In the simplified illustration, RBS1 provides CDMA channels F1A and F2A, RBS2 provides CDMA channels F1B, F2B and F3B, and RBS3 provides CDMA channels F2C and F3C. Those skilled in the art will appreciate the broad configurability of RBS/cell/channel relationships and that the illustrated relationship is an exemplary rather than limiting basis for discussion. Regardless, each CDMA channel includes forward and reverse CDMA channels, each comprising various radio links. Typical forward radio links on a given CDMA channel include overhead channels, such as paging, broadcast, and common control channels, along with individual radio links, each dedicated to one or more mobile stations 16 (users). Typical reverse link channels include, for example, one or more reverse access channels, which are generally available for mobile station use in, for example, transmitting call origination messages, other types of resource request messages, etc.

Each CDMA channel has a finite capacity to support users. Available transmit power and spreading codes represent the primary limits on CDMA channel capacity, at least on the forward radio links. To serve a particular user on a given CDMA channel, the network 10 allocates some changing portion of available transmit power and one or more spreading codes for code-multiplexing one or more individual information streams for the user onto the CDMA channel. The unavailability of either power or spreading code resources generally results in users being blocked from admission to the channel. Here, "admission" generally connotes the user being allocated one or more radio links on the CMDA channel, such as a dedicated forward radio link for individual user traffic. In any case, the maximum number of users that each CDMA channel can support changes with changing operating conditions, such as changing radio conditions for the individual users and changing service conditions (connection type, data rate, etc.) for such users.

In general, when radio link resources are requested for a given mobile station 16, network 10 allocates specific resources on one or more CDMA channels according to one or more exemplary resource granting methods. In older networks operating on single carrier frequencies, relatively fewer considerations were at play in the admission process as compared to admission in the multi-carrier environment of network 10. For example, if desired, network 10 may grant resources in soft handoff (SHO), wherein it grants radio links to a particular mobile station 16 on two or more CDMA channels such that reception at the mobile station 16 benefits from network transmit diversity. In combination with this SHO scenario, or as an alternative, the network 10 admits users in a manner that tends toward an optimum capacity utilization, wherein users are admitted such that CDMA channel loading is balanced across cells and carrier frequencies, as will be described in more detail later herein.

Figure 2:
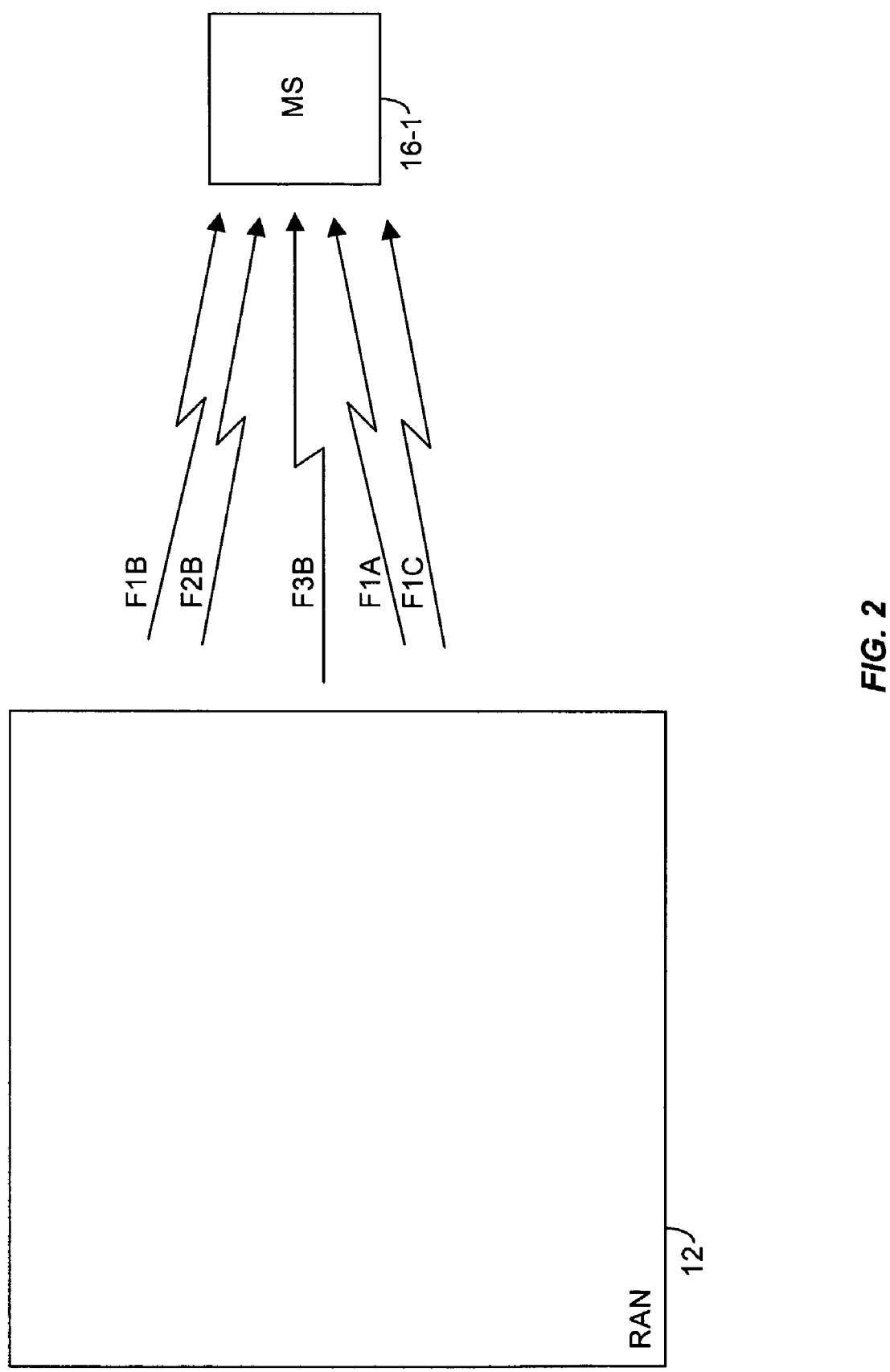
FIG. 2 is a diagram of a typical reception condition for a mobile station in a multi-carrier CDMA network.

FIG. 2 illustrates a typical reception scenario for a particular mobile station, denoted as 16-1 in the diagram. Here, mobile station 16-1 is physically located with respect to the various RBSs 32 such that it receives (or could receive) CDMA channels F1A, F1B, F2B, F3B, and F1C. If the mobile station 16-1 is idle, it typically monitors a paging channel within the CDMA channel it receives at the highest pilot signal strength. In this regard, each CDMA channel carries a forward link pilot signal, and mobile station 16-1 provides some form of pilot signal strength reporting for use by network 10 in determining the CDMA channels which will or might be used to serve the mobile station.

Such pilot signal strength reporting is common, and it is well known for mobile stations to provide, for example, a Radio Environment Report or the equivalent, which identifies a current set of pilot signals that the mobile station 16-1 is receiving above a defined signal strength. Radio Environment Reports are most commonly associated with initial admission, while similar information is provided by mobile stations 16 during active calls through "active set" reports, e.g., "Pilot Strength Measurement Messages," or the like.

For the illustrated scenario, the mobile station 16-1 might include pilot signal strength measurements for all or only some of the depicted CDMA channels, depending on the received signal strengths of the pilot signals for those channels. For example, where the mobile station 16-1 is configured to monitor only one carrier frequency at a time, such as in IS-2000 based networks, the mobile station 16-1 may provide pilot measurements for the F1A, F1B and F1C CDMA channels. For resource granting, the network 10 may consider these particular CDMA channels, and further might consider any channels on other frequencies, i.e., F2B and F3B, available within the associated cells.

With the availability of two or more carrier frequencies, an exemplary embodiment of network 10 selects a particular carrier frequency for granting radio link resources to a mobile station 16 based on SHO concerns, or based on inter-cell multi-carrier frequency loading concerns, or some combination thereof. In broad exemplary terms, the network 10 identifies a set of carrier frequencies to consider, and selects one of those carrier frequencies based one of the exemplary approaches detailed later herein. Methods of identifying the set of carrier frequencies to consider for selection vary, but in an exemplary approach, the network 10 (1) identifies the CDMA channel(s) associated with the resource request; (2) identifies the set of cells corresponding to the requested CDMA channel(s); and (3) identifies all the frequencies that are used in those corresponding cells.

Thus, in an exemplary embodiment, the network 10 identifies the set of carrier frequencies to consider based on determining which carrier frequencies could be used to serve the mobile station. As an example, the mobile station may request that radio links be granted on three CDMA channels (of the same frequency). In response, the network 10 may considering granting resources on the carrier frequency corresponding to the requested channels, or on any other carrier frequency available in one or more of the cells associated with the requested channels.

With the above in mind, an exemplary embodiment of network 10 performs multi-carrier admission (for origination or HHO) by granting radio link resources based on satisfying SHO performance concerns, or based on satisfying inter-cell multi-carrier frequency loading concerns, or some combination thereof. As such, FIG. 3 illustrates an exemplary method for granting radio link resources in response to resource requests associated with call originations and/or HHOs.

As will be explained in more detail later, such resource granting logic may be implemented in BSC 30, for example, in either hardware, software, or some combination thereof. Those skilled in the art will appreciate that the BSCs 30 and RBSs 32 typically process collections or "pools" of specialized and general purpose processing and control resources, and thus can be configured to execute essentially any desired call processing function or functions, including the admission control carrier frequency selection method described herein.

Figure 3:
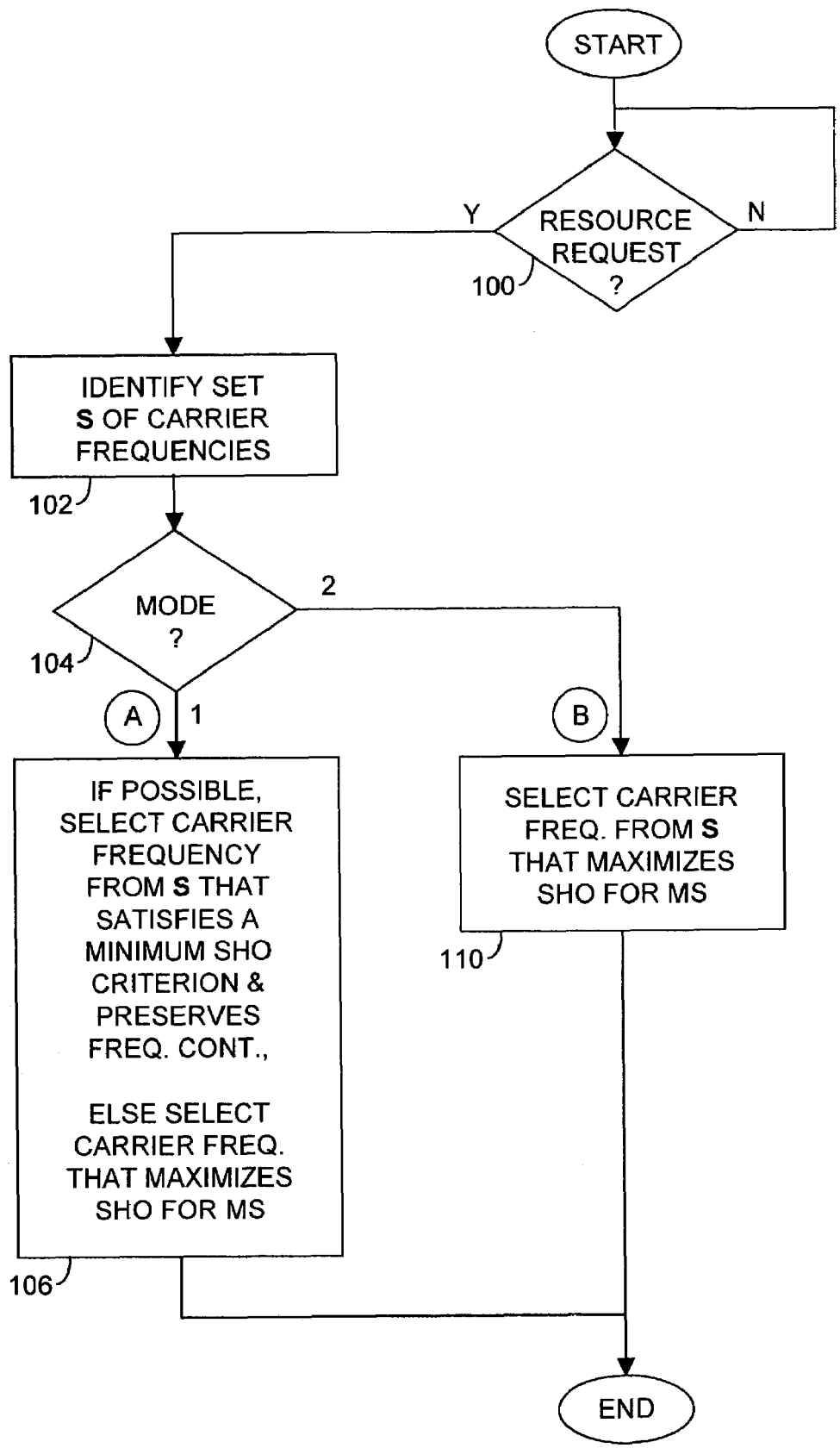
FIG. 3 is a diagram of exemplary carrier frequency selection logic used in granting radio link resources to mobile stations.

The logic of FIG. 3 illustrates operations whereby the network 10 grants requested radio link resources to mobile stations 16 in a manner that enhances connection reliability through soft handoff. That is, in broad terms, the BSC 30 processes a set of carrier frequencies to select the particular carrier frequency to be used for radio link assignments such that at least a minimum soft handoff criterion is met. Additional selection constraints may be used to further refine the carrier frequency selection method.

Processing begins with the BSC 30 receiving a resource request from a particular mobile station 16 (Step 100). Equivalently, the BSC 30 may generate the request in response to some triggering event. Until such a request is pending, the BSC 30 performs other processing as needed or desired. Once a resource request is received (or otherwise triggered), the network 10 selects a carrier frequency to be used for granting radio link resources to the mobile station 16 from an identified set of carrier frequencies.

In general, the resource request is associated with one or more CDMA channels (and therefore serves to identify one or more cells). For example, the resource request may specifically identify one or more CDMA channels on which radio link resources are desired. If so, BSC 30 might identify the set of carrier frequencies to be considered based on some or all of the carrier frequencies used in the set of cells corresponding to the requested CDMA channels.

More generally, the network 10 identifies the set of carrier frequencies to be considered for selection in resource granting based on CDMA channel information associated with or received from the mobile station 16. As an example, network 10 may consider some or all of the carrier frequencies in the cells corresponding to pilot signal information reported from the mobile station. In this context, network 10 receives a radio environment report or the like from the mobile station 16, which identifies one or more forward link pilot signals and, preferably, provides received signal strength information for the reported pilots. Each such pilot signal corresponds to a particular CDMA channel and, therefore, a particular cell. Thus, the network 10 may consider all carrier frequencies used in some or all of those cells corresponding to the reported pilot signals.

In other exemplary embodiments, it may consider the carrier frequencies corresponding to only a subset of such cells. For example, the network 10 may deem one or more of the CDMA channels corresponding to the reported pilots to be unacceptable or less preferred for resource granting because of, e.g., low pilot signal strength relative to the other reported pilots.

In any case, if the resource request is associated with call origination, BSC 30 operates in a first "mode" (mode 1), and if the resource request is associated with HHO, it operates in a second mode (mode 2). Of course, such modal operation may be more descriptive than literal in the sense that it is sufficient that the BSC 30 recognize that some soft handoff considerations used in carrier frequency selection are appropriate for call origination but not for HHO. Thus, if the resource request is associated with call origination (Step 104), mode 1 is "active" and the BSC 30 selects the carrier frequency to be used for granting radio link resources to the mobile station 16 based on the following carrier frequency selection steps (Step 106):

if possible, and if it satisfies a minimum SHO criterion, select the carrier frequency used by the mobile station to transmit the origination message; else select the carrier frequency that maximizes SHO for the mobile station 16 (i.e., results in the greatest number of forward radio links).

Thus, the above logic implements a selection priority that essentially holds that (1) BSC 30 should first ensure that it selects a carrier frequency that provides at least minimal SHO (e.g., available radio links on at least two CDMA channels); (2) if such a carrier frequency matches the carrier frequency used by the mobile station to send its origination request, that frequency should be selected since the radio conditions in that frequency have already been demonstrated to be suitable for communication with the mobile station 16 (matching the frequency in this manner is referred to as "preserving frequency continuity" with the mobile station 16); and (3) if (2) is not possible, then simply pick the carrier frequency that offers the most available radio links for assignment to the mobile station, e.g., the greatest number of CDMA channels with resources available for serving the mobile station.

If the resource request is associated with HHO, BSC 30 selects the operations associated with mode 2 (Step 104). One distinction is that, unlike call origination, the BSC 30 explicitly does not preserve carrier frequency continuity with mobile stations 16 requesting service in association with a HHO event. Thus, BSC 30 selects the carrier frequency that maximizes SHO for the mobile station 16 (Step 110). With a specific carrier frequency selected, selection processing ends and the BSC 30 grants radio link resources to the mobile station 16 in the selected carrier frequency.

Figure 4:
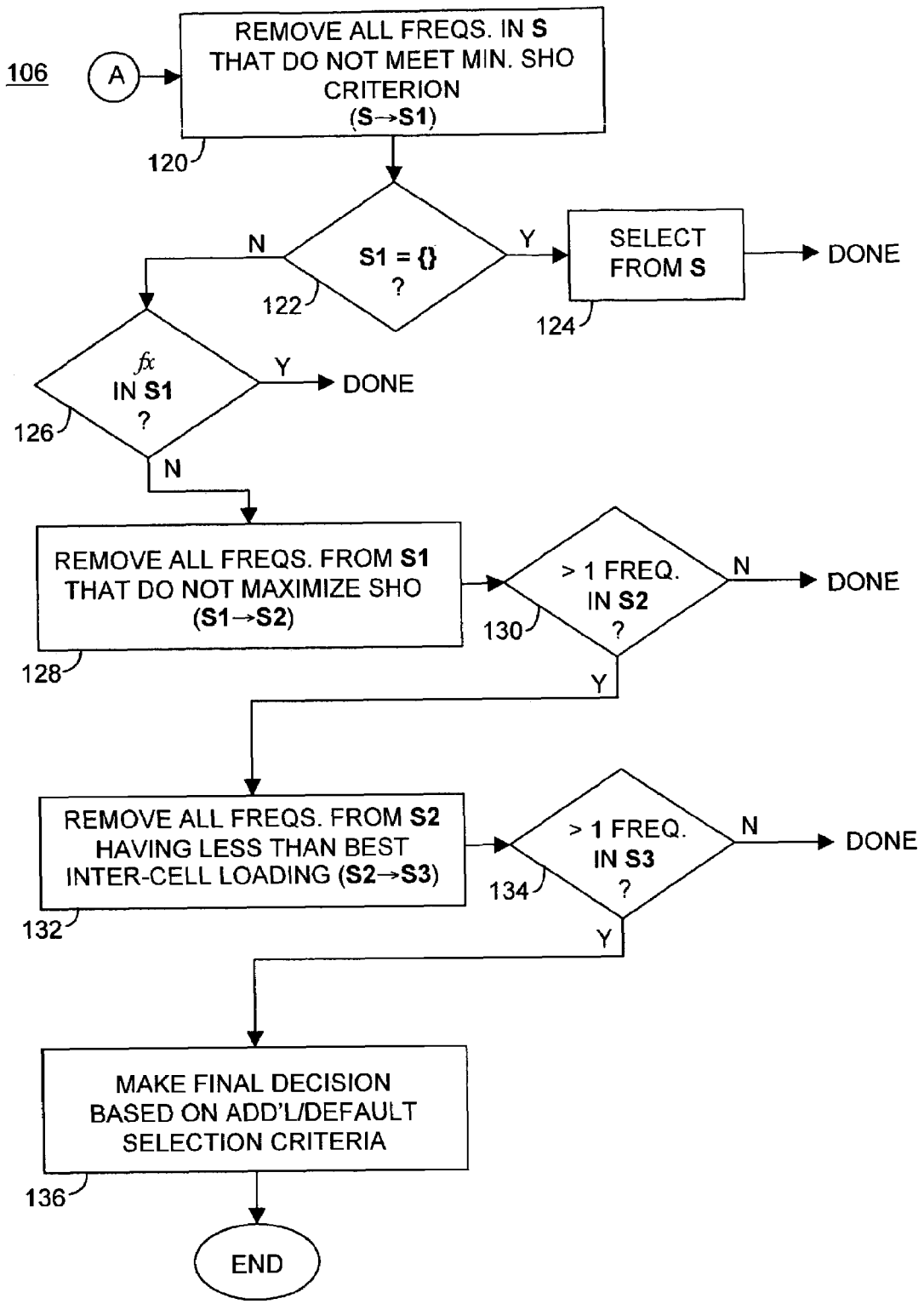
FIG. 4 is a diagram of exemplary additional details for the logic flow of FIG. 3.

FIG. 4 illustrates exemplary details for mode 1 carrier selection processing (Step 106 of FIG. 3). The selection methodology begins with identification of the set S of carrier frequencies to be considered for radio link assignments to the mobile station 16. First, BSC 30 removes all frequencies from S that do no meet the minimum SHO criterion (Step 120). This removal results in the reduced set S1. If S1 is the null set, no frequency satisfied the minimum SHO criterion, and the carrier frequency selection is made from the original set S based on other criteria, such as single CDMA channel resource availability or relative resource loading between individual channels and/or frequencies (Step 124).

If S1 is not the null set, and if the mobile station's current frequency $f_x$ is in S1, i.e., the frequency it used to send the origination request message, that carrier frequency is selected for granting radio links to the mobile station 16 (Yes from Step 126). As noted, preserving frequency continuity, i.e., using the same frequency as was used by the mobile station 16 in association with the resource request, has value because that frequency has already been demonstrated as suitable for communicating with the mobile station 16. If such a frequency is not in S1, BSC 30 removes all frequencies from S1 that do not maximize SHO for the mobile station 16 (i.e., it removes any carrier frequency that offers fewer available CDMA channels than any other carrier frequency in S1) (Step 128). This set reduction operation yields set S2.

If S2 includes only one carrier frequency, that frequency is selected and selection processing is done (Step 130). However, if S2 includes more than one carrier frequency, i.e., carrier frequencies offering the same number of radio links for assignment, BSC 30 evaluates the inter-cell multi-carrier loading of each carrier frequency in S2 for a neighborhood of cells, which neighborhood may be extended beyond the particular cell or cells which initially will be used to serve the mobile station 16. By doing so, BSC 30 potentially identifies which carrier frequency has the most favorable loading condition across the set of cells being considered in the selection process.

In an exemplary embodiment, for each carrier frequency in S2, BSC 30 evaluates the resource loading (e.g., transmit power availability and/or spreading code availability) for each CDMA channel of that carrier frequency in the neighborhood of cells. Then, BSC 30 compares the most heavily loaded one of the CDMA channels in each carrier frequency in the set with the most heavily loaded one of the CDMA channels in every other carrier frequency in the set, and removes any frequency from S2 having a worse worst-case CDMA channel load than any other carrier frequency in S2 (Step 132).

Thus, the carrier frequency having the least most heavily loaded CDMA channel for the set of cells considered represents the carrier frequency in S2 having the "best" inter-cell loading. As noted, the cell set may be extended beyond those cells having CDMA channels that will (or could) be used initially to serve the mobile station 16. That is, BSC 30 might avoid selecting a CDMA channel for initially serving the mobile station 16 if that channel is in a carrier frequency that has relatively heavily "loaded" CDMA channels in one or more neighboring cells.

Of course, other formulations of the "best" inter-cell loading assessment are contemplated by the present invention. For example, the average loading across all CDMA channels under consideration for each carrier frequency may be determined and then compared. With this approach, the "best" inter-cell loading condition may be identified as the carrier frequency having the lowest average resource loading across all of its CDMA channels under consideration. Of course, such selection could be qualified by determining whether any of those CDMA channels were at or near some critical resource loading threshold. In that manner, the resource granting method selects the carrier frequency having low average resource loading and acceptable worst case loading on all of its CDMA channels under consideration.

Regardless of the particular embodiment of inter-cell loading evaluation, if only one frequency remains in S3 after the inter-cell loading comparison, selection processing is done and that sole remaining carrier frequency is used for granting radio link resources (Step 134). Otherwise, the BSC 30 employs additional selection criteria, such as the use of a default selection preference to narrow the choices to a finally selected carrier frequency (Step 136).

The above logic may be combined with other selection method as needed or desired. In all cases, the carrier frequency selection method should result in the selection of at least one carrier frequency corresponding to at least one CDMA channel having resources available to grant the resource request for the mobile station 16.

Figure 5:
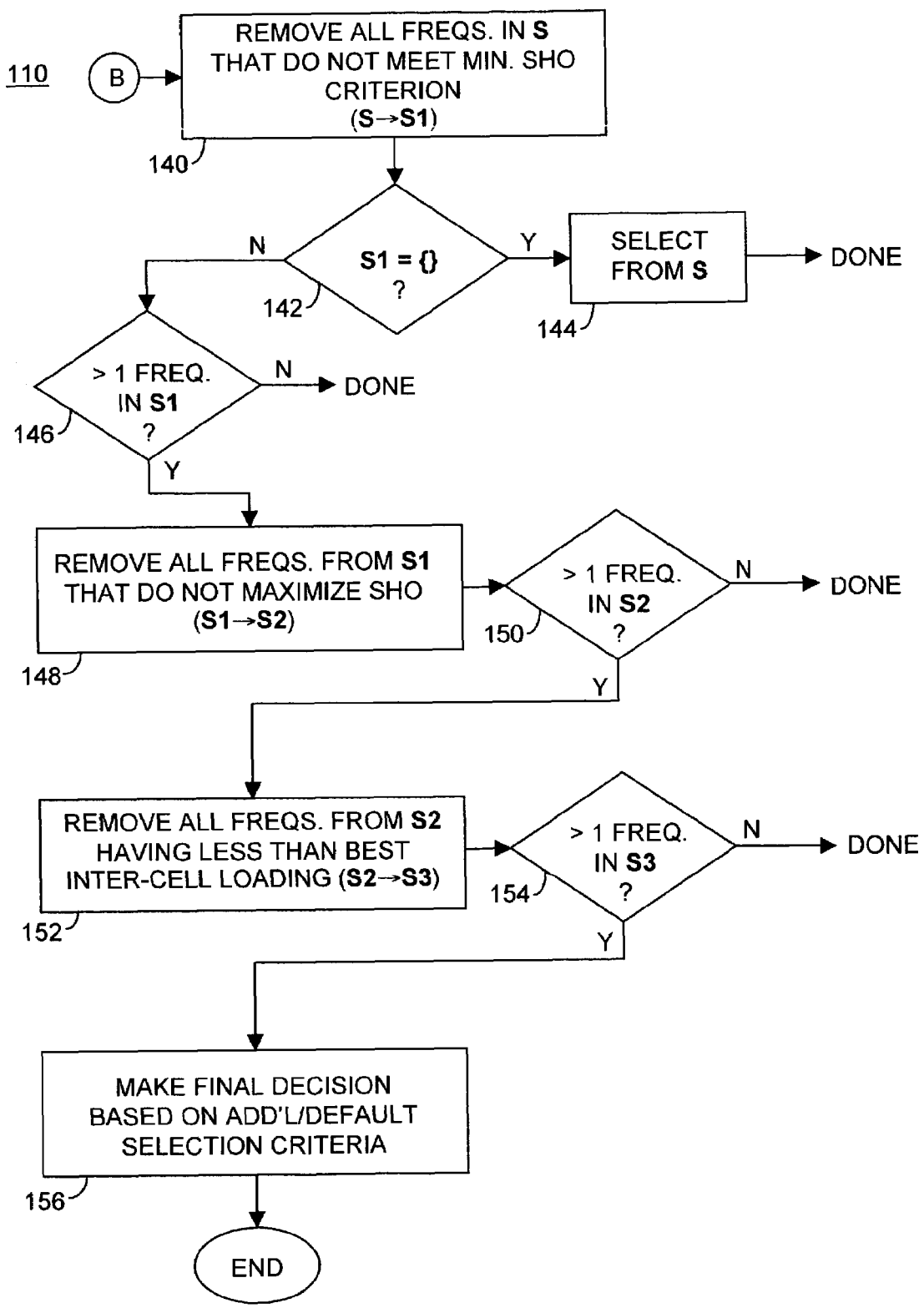
FIG. 5 is a diagram of exemplary additional details for the logic flow of FIG. 3.

FIG. 5 illustrates exemplary selection process steps for mode 2 carrier frequency selection operations. Such steps are distinguished from the operations in FIG. 4 by the omission of the step of preserving carrier frequency continuity (FIG. 4, Step 126), as that step is not desired for granting resources in HHO. In other respects, the logic of FIG. 5 is similar to that of FIG. 4 in that BSC 30 selects a carrier frequency that at least satisfies the minimum SHO criterion, provided at least one such carrier frequency exists, and preferably one that maximizes SHO for the mobile station. Here, the carrier frequency that maximizes soft handoff is the one that offers the greatest number of radio links for assignment to the mobile station 16, e.g., the greatest number of CDMA channels that can be used to serve the mobile station 16. If more than one carrier frequency would thus maximize SHO, BSC 30 selects a specific one of such carrier frequencies by determining the inter-cell multi-carrier load balance of the remaining frequencies under consideration, for example, and selecting the carrier frequency having the most favorable loading condition as explained above.

Figure 6:
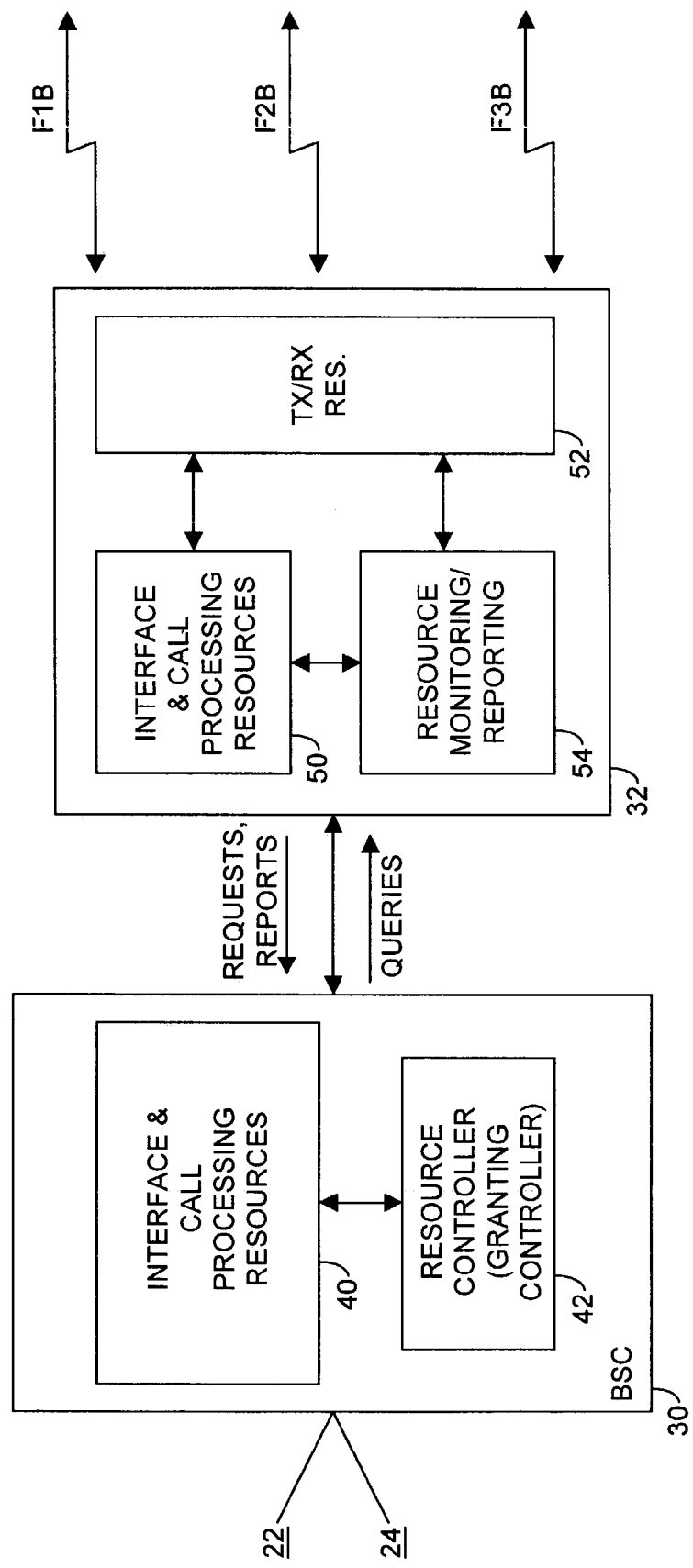
FIG. 6 is a diagram of exemplary BSC and RBS details.

FIG. 6 illustrates an exemplary BSC and RBS arrangement for supporting such load balancing admission control and, more broadly, for supporting the present invention in its various embodiments. An exemplary BSC 30 comprises interface and call processing resources 40 and (or in combination with) a resource controller 42. In this context, resource controller 42 operates as an admission/granting controller for carrier frequency selection and radio link resource granting in accordance with the present invention. Those skilled in the art will appreciate that FIG. 6 may represent a functional arrangement of dedicated and general purpose processing resources, e.g., arrangements of microprocessors executing defined computer instructions, Digital Signal Processors (DSPs), Application Specific Integrated Circuits (ASICS), or other programmable circuits, in combination with call routing resources, such as ATM switching resources, and inter-entity interfaces, such as an RBS interface for communicating with RBSs operating under control of BSC 30.

Similarly, the exemplary RBS 32 comprises interface and control processing resources 50, radio frequency transceiver resources 52, and a resource monitor 54. RBS 32 provides one or more CDMA channels, here illustrated as F1B, F2B and F3B, supporting forward and reverse link communication with pluralities of mobile stations 16 in the defined carrier frequencies. As noted earlier herein, each CDMA channel supported by transceiver resources 52 in RBS 32 operates with limited transmit power and spreading code resources on the forward link.

Because utilization of such resources changes dynamically with changing operation conditions, RBS 32 provides BSC 30 with resource loading information. In particular, resource monitor 54 may be configured to track current power allocations (or remaining power availabilities) on a CDMA channel basis, or on some other basis as needed or desired. Resource monitor 54 may also track other limiting resources that bear on radio link availability within one or more of the CDMA channels at the RBS 32. Additionally, if spreading code resource availability information is not already available at BSC 30, resource monitor 54 may be configured to provide that information as well.

In any case, the BSC 30 and RBS 32 may be configured to provide novel inter-entity signaling in support of the present invention. In an exemplary arrangement, the BSC 30 generates a resource availability query message that prompts the RBS 32 to report current resource loading conditions for one or more of the CDMA channels provided at that RBS 32. In addition to this query-based signaling, or as an alternative, the RBS 32 may provide periodic resource loading reports to the BSC 30. The particular reporting period may be system-dependent, or may be configurable as needed or desired. Of course, the desire to have frequent loading reports preferably is balanced With the interest in avoiding excessive network signaling.

Regardless of the particular reporting and/or query method implemented in network 10, such reporting enables dynamic inter-cell multi-carrier load balancing with or without the SHO carrier selection operations described above. Indeed, the benefits of granting radio link resources to users based on considering relative carrier frequency loading across sets of cells are such that network 10 may perform carrier frequency selection on that basis alone. For example, with either HHO or call origination, the network's ability to fully utilize CDMA channel capacity is enhanced if admission operations tend to maintain balanced resource loading across the available carrier frequencies.

As was noted earlier herein, in an exemplary embodiment, the resource request identifies, or is otherwise associated with, at least one CDMA channel. Thus, the network has knowledge of the carrier frequency corresponding to that channel (or channels), and further has knowledge of the other carrier frequencies available in the cell or cells corresponding to the requested CDMA channel(s). On this basis, the network 10 identifies the set of carrier frequencies, any one of which could be used to serve the mobile station 16. With the carrier frequencies thus identified, the network 10 need only determine the set of cells across which carrier frequency loading is to be considered. The union of the frequency set and the cell set (neighborhood) identifies the CDMA channels for which channel loading is to be evaluated.

Thus, the cell set might be the set of cells corresponding to the requested channels, a subset of those cells, or some expanded set based on immediately neighboring cells, neighbors of those immediately neighboring cells, and so on. Such cell set expansion may be based on pre-configured information stored in network 10 for each cell or groups of cells, such as inter-cell adjacency information, and/or expected user mobility, etc.

In any case, the set of cells considered in load balancing defines the CDMA channels to be evaluated for each carrier frequency being considered for selection. After determining CMDA channel resource loading for each carrier frequency in each cell, the BSC 30 may compare the relative channel loadings in each frequency to determine which carrier frequency has the best loading condition across the set of cells, as explained earlier.

The loading condition may be, for example, a best worst-case load evaluated for all CDMA channels and all frequencies. Such an evaluation can be expressed as, arg(min(max (channel load))), and is based on the resource controller 42 identifying the most heavily loaded CDMA channel in each frequency for the set of cells being considered, and then determining which of these most heavily loaded channels is the least-loaded channel among them. The carrier frequency having that channel is considered to have the best worst-case loading condition and is thus selected.

Of course, other loading metrics may be computed and compared by the resource controller 42, such as average CDMA channel loading, or loading in particular ones in the set of cells with or without regard to other ones of the cells. As noted, worst-case and average loadings may be considered in combination with each other. All such inter-cell loading evaluations may be weighted to favor the selection of one carrier frequency over another based on, for example, reported pilot signal strengths from the mobile station 16, expected mobility of the mobile station 16, the nature of the mobile's current cell, e.g., large, small, urban, rural, etc.

In one embodiment particularly suited for IS-2000 based implementations of network 10, call admission load balancing may exploit information provided by the mobile station 16 as part of Call Admission into Soft Handoff (CASH). With CASH, the mobile station 16 requests radio link resources such that its call service begins soft handoff on the forward link. Supporting CASH processing, the mobile station 16 transmits a Radio Environment Report that identifies the CDMA channels that may be used to serve the mobile station 16. The cells considered in inter-cell multi-carrier load balancing may be based on the cells corresponding to the identified CDMA channels. Further, the set of cells considered may be expanded as needed or desired. In one or more exemplary embodiments, the CDMA channel sets evaluated for multi-carrier load balancing may be based on any one of the sets of CDMA channels:

(a) a subset of CDMA channels in the Radio Environment Report;
(b) the full set of CDMA channels in the Radio Environment Report;
(c) the set of CDMA channels belonging to the mobile station's current cell plus all neighboring cells of the current cell;
(d) the set of CDMA channels belonging to a defined "neighbor list" generated for the mobile station's active set (or reported set of pilots, e.g., Radio Environment Report);
(e) the set of CDMA channels neighboring all cells associated with the active set (or reported set of pilots, e.g., Radio Environment Report); or
(f) all CDMA channels available in the entire BSS, the entire RAN 12, or the entire network 10.

With respect to the above list, the possible cell set formulations are listed in an order of increasing preference, or at least in order of increasing value, with respect to increasing "system mobility." That is, as the mobility of users increases, the number of cells over which it is valuable to perform inter-cell multi-carrier load balancing increases. Despite this increased value, one may wish to constrain the set of cells considered to something less expansive than choice (f), or even less than choices (d), (e) and (f) in the above list, given the amount of inter-entity signaling required to gather resource loading information from the involved RBSs 32.

One point regarding carrier frequency selection based on inter-cell load balancing that should be apparent from the above discussion is that the CDMA channels evaluated in terms of resource loading for carrier frequency selection may extend beyond the channel(s) on which resources will or even could be initially granted to the mobile station. For example, when evaluating the loading condition of a given carrier frequency under consideration for resource granting, network 10 may evaluate the resource loading of one or more CDMA channels that, at least initially, will not be used to serve the mobile station 16.

As an example, assume that the mobile station 16 could initially be served on F1A and F1B or on F2A. If one or both F1A and F1B were heavily loaded in comparison to F2A, granting resources in carrier frequency F2 would seem like the better choice because of its more favorable loading condition. However, given the possible inter-cell movement of mobile station 16 after being admitted, F2 might actually be a poorer choice if CDMA channels in F2 are very heavily loaded in one or more cells neighboring Cells A and B. Thus, network 10 might advantageously consider these other CDMA channels in its carrier frequency selection method, even though they are not used for initial resource assignment.

Regardless of the how the cell set is defined, the resource loading of each CDMA channel involved may be determined or otherwise represented based on one or more loading metrics. Remaining channel power represents a straightforward metric that is used in one or more exemplary embodiments. Of course, the converse value of currently allocated power may be used to represent loading. In both cases, the loading metric for each channel describes the remaining availability of forward link transmit power currently available for serving any radio links granted on the channel.

In other embodiments, the loading metric may represent the number of remaining spreading codes available for the CDMA channel (or the number of spreading codes currently used). This spreading code information may further include an indication of whether an "expanded" spreading code set is being used, such as where "quasi" orthogonal codes are used to supplement a base set of orthogonal spreading codes, or where long spreading codes are used with or instead of a smaller set of short spreading codes, e.g., the set of 128-length Walsh codes versus the set of 64-length Walsh codes.

In one exemplary embodiment the loading metric is tailored to the most "precious" CDMA channel resource. Thus, if transmit power represents the most frequently exhausted resource, the loading metric is more sensitive to power availability than spreading code availability, or vice versa if spreading code resources are exhausted more often than power resources. In other embodiments, the loading metric for each channel may represent a combined power/code availability measurement, with equal or different weightings for power resources and code resources.

Regardless, inter-cell multi-carrier load balancing permits the network 10 to select a particular carrier frequency to be used in granting radio link resources to mobile stations 16 in a manner that tends to balance resource loading across the carrier frequencies available within a neighborhood of cells. Thus, selection of the carrier frequency currently having the best inter-cell loading condition tends to increase the capacity utilization of the network 10 by balancing resource loading across multiple carrier frequencies in multiple network cells.

Figure 7:
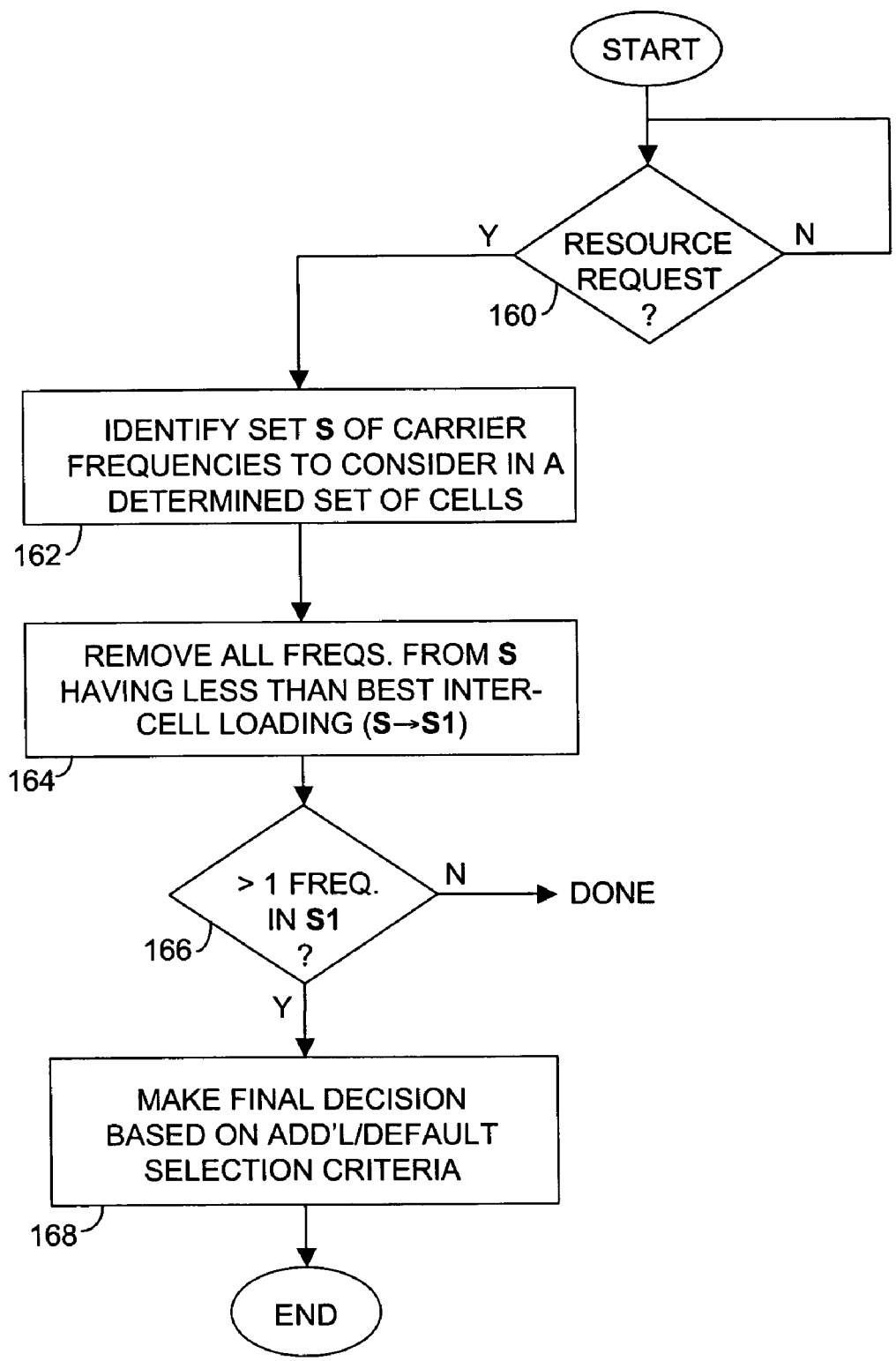
FIG. 7 is a diagram of exemplary carrier frequency selection logic based on inter-cell load balancing.

FIG. 7 illustrates exemplary flow logic for carrier frequency selection based on stand-alone evaluation of inter-cell multi-carrier load balancing. As with the other logical operations described above, in an exemplary embodiment, the illustrated logic may be implemented at BSC 30 in hardware, or software, or some combination thereof. Processing begins with the BSC 30 waiting for a resource request (Step 160). It should be understood that BSC 30 performs other processing tasks as needed or desired while waiting. In response to receiving a resource request, BSC 30 identifies a set S of carrier frequencies to consider in a determined set of cells (Step 162).

BSC 30 then determines the loading condition for each carrier frequency in the set S of carrier frequencies based on the CDMA channel loadings for all CDMA channels in the set of cells across which carrier frequency loading is being evaluated. By comparing the relative carrier frequency loading conditions, BSC 30 eliminates all carrier frequencies in S that have less than a best inter-cell loading condition (as described above) (Step 164). As noted above, for each CDMA channel considered, BSC 30 may determine a loading metric, and then compare such loading metrics across the set of carrier frequencies to identify the carrier frequency having the most favorable inter-cell loading condition.

If only one carrier frequency remains, the carrier frequency selection process is complete (Step 166). However, if two or more carrier frequencies have equally best inter-cell loading, the final carrier frequency selection may be based on additional/default criteria (Step 168). In general, the loading metric used in inter-cell multi-carrier load balancing may be adjusted as needed or desired.

Indeed, the present invention broadly offers significant opportunity for variation. In one or more exemplary embodiments the inventive selection method and apparatus performs carrier frequency selection to maximize a soft handoff condition for the mobile station on the forward link, or meeting at least minimum soft handoff criterion for the forward link while preserving frequency continuity with the mobile station, or based on balancing inter-cell multi-carrier frequency resource loading, possibly in combination with SHO-based selection. As such, the foregoing details are exemplary and not limiting. Indeed, the present invention is limited only by the scope of the following claims and the reasonable equivalents thereof.

What is claimed is:

1. A method of granting radio link resources to a mobile station in a multi-carrier CDMA network:
   receiving a resource request for a mobile station to be served by the network;
   identifying a set of carrier frequencies to be considered for serving the mobile;
   selecting a carrier frequency for granting radio link resources from the set of carrier frequencies according to selective operation in either a first or a second mode wherein the first mode differs from the second mode;
   wherein, in the first mode, selecting, if possible, a carrier frequency that satisfies a minimum soft handoff condition and preserves frequency continuity with the mobile station, else selecting a carrier frequency that maximizes soft handoff for the mobile station; and
   wherein, in the second mode, selecting a carrier frequency that maximizes soft handoff for the mobile station.

2. The method of claim 1, further comprising granting radio link resources on one or more CDMA channels in the selected carrier frequency.

3. The method of claim 1, wherein identifying a set of carrier frequencies to be considered for serving the mobile station comprises identifying the carrier frequencies used in cells associated with at least a subset of CDMA channels identified in the resource request.

4. The method of claim 1, wherein identifying a set of carrier frequencies to be considered for serving the mobile station comprises identifying the carrier frequencies used in cells corresponding to pilot signal information reported from the mobile station.

5. The method of claim 1, wherein identifying a set of carrier frequencies to be considered for serving the mobile station comprises identifying the carrier frequencies used in a set of cells of the network, including at least a current cell of the mobile station.

6. The method of claim 1, wherein identifying a set of carrier frequencies to be considered based on the resource request comprises identifying the carrier frequencies of all CDMA channels that potentially could be used to serve the mobile station.

7. The method of claim 1, wherein, in the first and second modes, if more than one carrier frequency maximizes soft handoff for the mobile station, selecting the carrier frequency that has a best inter-cell loading condition.

8. The method of claim 7, wherein, if two or more carrier frequencies have equally best inter-cell loading conditions, selecting one of such carrier frequencies based on a default selection criteria.

9. The method of claim 7, wherein selecting the carrier frequency that has a best inter-cell loading condition comprises:
   evaluating resource loading for each CDMA channel in each carrier frequency within a set of cells; and
   selecting the carrier frequency having the most favorable loading condition across the set of cells.

10. The method of claim 9, further comprising determining the set of cells based on the resource request.

11. The method of claim 10, wherein determining the set of cells based on the resource request comprises selecting at least a subset of cells corresponding to the CDMA channels on which resources are requested.

12. The method of claim 9, further comprising determining the set of cells based on a current cellular location of the mobile station.

13. The method of claim 12, wherein determining the set of cells based on a current cellular location of the mobile station comprises identifying a current cell of the mobile station and one or more neighboring cells.

14. The method of claim 9, wherein evaluating resource loading for each CDMA channel in each carrier frequency within a set of cells comprises:
   determining a worst-case CDMA channel resource loading for each carrier frequency; and
   identifying the carrier frequency having a least worst-case CDMA channel resource loading as the carrier frequency having the most favorable loading condition across the set of cells.

15. The method of claim 9, wherein evaluating resource loading for each CDMA channel in each carrier frequency within a set of cells comprises:
   determining an average CDMA channel resource loading for each carrier frequency; and
   identifying the carrier frequency having a lowest average COMA channel resource loading as the carrier frequency having the most favorable loading condition across the set of cells.

16. The method of claim 1, further comprising receiving resource loading information for the CDMA channels in each frequency within a set of cells from one or more Radio Base Stations (RBSs) associated with the CDMA channels.

17. The method of claim 1, further comprising selectively operating in the first mode or in the second mode based on whether the resource request is associated with a call origination or is associated with a hard handoff.

18. A method for allocating radio link resources to a mobile station in a multi-carrier COMA network:
   receiving a resource request for a mobile station to be served by the network; and
   selecting a carrier frequency for granting radio link resources to the mobile station from a set of carrier frequencies based on evaluating COMA channel loading for each carrier frequency across a set of cells, wherein evaluating COMA channel loading for each carrier frequency across a set of cells comprises:
   determining a worst-case COMA channel resource loading for each carrier frequency; and
   selecting the carrier frequency having a best worst-case COMA channel resource.

19. The method of claim 18, further comprising identifying the set of cells based on a current cellular location of the mobile station.

20. The method of claim 19, further comprising setting a range of neighboring cells to be included in the set of cells based on system mobility.

21. The method of claim 18, further comprising identifying the set of cells based on pilot signal information from the mobile station.

22. The method of claim 18, further comprising identifying the set of carrier frequencies as those carrier frequencies that could potentially be used initially to serve the mobile station.

23. The method of claim 22, wherein identifying the set of carrier frequencies as those carrier frequencies that could potentially be used initially to serve the mobile station comprises identifying all carrier frequencies used in cells corresponding to pilot signal information reported from the mobile station.

24. A method for allocating radio link resources to a mobile station in a multi-carrier CDMA network:
receiving a resource request for a mobile station to be served by the network; and
selecting a carrier frequency for granting radio link resources to the mobile station from a set of carrier frequencies based on evaluating CDMA channel loading for each carrier frequency across a set of cells, wherein evaluating CDMA channel loading for each carrier frequency across a set of cells comprises:
determining an average CDMA channel resource loading for each carrier frequency; and
selecting the carrier frequency having a lowest average CDMA channel resource loading.

25. A Base Station Controller (BSC) for use in a multi-carrier CDMA network comprising:
a Radio Base Station (RBS) interface to communicatively couple the BSC to one or more RBSs for serving mobile stations on a plurality of CDMA channels; and
a resource controller to select a carrier frequency for granting radio link resources to a mobile station in a multi-carrier CDMA network based on:
receiving a resource request for a mobile station to be served by the network;
identifying a set carrier frequencies to be considered for serving the mobile;
selecting a carrier frequency for granting radio link resources from the set of carrier frequencies according to selective operation in either a first or a second mode wherein the first mode differs from the second mode;
wherein, in the first mode, selecting, if possible, a carrier frequency that satisfies a minimum soft handoff condition and preserves frequency continuity with the mobile station, else selecting a carrier frequency that maximizes soft handoff for the mobile station; and
wherein, in the second mode, selecting a carrier frequency that maximizes soft handoff for the mobile station.

26. The BSC of claim 25, wherein the BSC grants radio link resources on one or more CDMA channels in the selected carrier frequency.

27. The BSC of claim 25, wherein the BSC identifies a set of carrier frequencies to be considered for serving the mobile station by identifying the carrier frequencies used in cells associated with at least a subset of CDMA channels requested in the resource request.

28. The BSC of claim 25, wherein the BSC identifies a set of carrier frequencies to be considered for serving the mobile station by identifying the carrier frequencies used in cells corresponding to pilot signal information reported from the mobile station.

29. The BSC of claim 25, wherein the BSC identifies a set of carrier frequencies to be considered for serving the mobile station by identifying the carrier frequencies used in one or more cells of the network, including at least the current cell of the mobile station.

30. The BSC of claim 25, wherein the BSC identifies a set of carrier frequencies to be considered based on the resource request by identifying the carrier frequencies of all CDMA channels that potentially could be used to serve the mobile station.

31. The BSC of claim 25, wherein, in the first and second modes, if more than one carrier frequency maximizes soft handoff for the mobile station, the BSC selects the carrier frequency that has a best inter-cell loading condition.

32. The BSC of claim 31, wherein, if more two or more carrier frequencies have equally best inter-cell loading conditions, the BSC selects one of such carrier frequencies based on a default selection criteria.

33. The BSC of claim 31, wherein the BSC selects the carrier frequency that has a best inter-cell loading condition by:
evaluating resource loading for each CDMA channel in each carrier frequency within a set of cells; and
selecting the carrier frequency having the most favorable loading condition across the set of cells.

34. The BSC of claim 33, wherein the BSC determines the set of cells based on the resource request.

35. The BSC of claim 34, wherein the BSC determines the set of cells based on the resource request by selecting at least a subset of cells corresponding to the CDMA channels on which resources are requested.

36. The BSC of claim 33, wherein the BSC determines the set of cells based on a current cellular location of the mobile station.

37. The BSC of claim 36, wherein the BSC determines the set of cells based on a current cellular location of the mobile station by identifying a current cell of the mobile station and one or more neighboring cells.

38. The BSC of claim 33, wherein the BSC evaluates resource loading for each CDMA channel in each carrier frequency within a set of cells by:
determining a worst-case CDMA channel resource loading for each carrier frequency; and
identifying the carrier frequency having a least worst-case CDMA channel resource loading as the carrier frequency having the most favorable loading condition across the set of cells.

39. The BSC of claim 33, wherein the BSC evaluates resource loading for each CDMA channel in each carrier frequency within a set of cells by:
determining an average CDMA channel resource loading for each carrier frequency; and
identifying the carrier frequency having a lowest average CDMA channel resource loading as the carrier frequency having the most favorable loading condition across the set of cells.

40. The BSC of claim 33, wherein the BSC receives resource loading information via the RBS interface from one or more RBSs associated with CDMA channels being considered in resource loading evaluation.

41. The BSC of claim 40, wherein the BSC receives the resource loading information responsive to sending resource query messages to the one or more RBSs via the RBS interface.

42. The BSC of claim 40, wherein the BSC receives the resource loading information based on receiving periodic resource loading messages from the one or more RBSs via the RBS interface.

43. The BSC of claim 40, wherein the resource loading information comprises at least one of transmit power availability and spreading code availability for the CDMA channels being considered in resource loading evaluation.

44. The BSC of claim 25, wherein the BSC selectively operates in the first mode or in the second mode based on whether the resource request is associated with a call origination or is associated with a hard handoff.

45. A Base Station Controller (BSC) for use in a multi-carrier CDMA network comprising:
a Radio Base Station (RBS) interface to communicatively couple the BSC to one or more RBSs for serving mobile stations on a plurality of CDMA channels; and a resource controller to select a carrier frequency for granting radio link resources to a mobile station in a multi-carrier CDMA network based on:
  receiving a resource request for a mobile station to be served by the network;
  identifying a set of carrier frequencies to be considered for serving the mobile; and
  selecting a carrier frequency for granting radio link resources to the mobile station from the set of carrier frequencies based on evaluating CDMA channel resource loading for each carrier frequency across a set of cells, wherein the BSC evaluates CDMA channel resource loading for each carrier frequency across the set of cells by:
    determining a worst-case CDMA channel resource loading for each carrier frequency; and
    selecting the carrier frequency having a best worst-case CDMA channel resource.

46. The BSC of claim 45, wherein the BSC determines the set of cells based on a current cellular location of the mobile station.

47. The BSC of claim 46, wherein the BSC sets a range of neighboring cells to be included in the set of cells based on system mobility.

48. The BSC of claim 45, wherein the BSC identifies the set of cells based on pilot signal information from the mobile station.

49. The BSC of claim 45, wherein the BSC identifies the set of carrier frequencies as those carrier frequencies that could potentially be used initially to serve the mobile station.

50. The BSC of claim 49, wherein the BSC identifies those carrier frequencies that could potentially be used initially to serve the mobile station by identifying all carrier frequencies used in cells corresponding to pilot signal information reported from the mobile station.

51. A Base Station Controller (BSC) for use in a multi-carrier CDMA network comprising:

a Radio Base Station (RBS) interface to communicatively couple the BSC to one or more RBSs for serving mobile stations on a plurality of CDMA channels; and a resource controller to select a carrier frequency for granting radio link resources to a mobile station in a multi-carrier CDMA network based on:
  receiving a resource request for a mobile station to be served by the network;
  identifying a set of carrier frequencies to be considered for serving the mobile; and
  selecting a carrier frequency for granting radio link resources to the mobile station from the set of carrier frequencies based on evaluating CDMA channel resource loading for each carrier frequency across a set of cells, wherein the BSC evaluates CDMA channel resource loading for each carrier frequency across the set of cells by:
    determining an average CDMA channel resource loading for each carrier frequency; and
    selecting the carrier frequency having a lowest average CDMA channel resource loading.

52. The BSC of claim 45, wherein the BSC receives CDMA channel resource loading information from the one or more RBSs via the RBS interface.

53. The BSC of claim 52, wherein the BSC queries particular ones of the one or more RBSs for CDMA channel resource loading information as needed.

54. The BSC of claim 52, wherein the BSC receives periodic CDMA channel resource loading information from the one or more RBSs.

55. The BSC of claim 52, wherein, for a particular CDMA channel, the CDMA channel resource loading information comprises at least one of a transmit power availability and a spreading code availability for that CDMA channel.

* * * * *

UNITED STATES PATENT AND TRADEMARK OFFICE
CERTIFICATE OF CORRECTION

| | | |
|---|---|---|
| PATENT NO. | : 7,403,505 B2 | |
| APPLICATION NO. | : 10/334500 | |
| DATED | : July 22, 2008 | |
| INVENTOR(S) | : Yoon et al. | |

It is certified that error appears in the above-identified patent and that said Letters Patent is hereby corrected as shown below:

On the Title Page, in Item (75), under "Inventors", in Column 1, Line 3, delete "Todd Ruth" and insert -- Todd E. Ruth --, therefor.

On Title Page, page 2, in Item (56), under "OTHER PUBLICATIONS", in Column 1, Line 2, delete "Mulitple" and insert -- Multiple --, therefor.

In Column 3, Line 53, delete "(it" and insert -- (if --, therefor.

In Column 6, Line 46, delete "CMDA" and insert -- CDMA --, therefor.

In Column 11, Line 61, delete "With" and insert -- with --, therefor.

In Column 12, Line 33, delete "CMDA" and insert -- CDMA --, therefor.

In Column 15, Line 16, in Claim 1, insert -- , --, before "wherein".

In Column 16, Line 25, in Claim 15, delete "COMA" and insert -- CDMA --, therefor.

In Column 16, Line 37, in Claim 18, delete "COMA" and insert -- CDMA --, therefor.

In Column 16, Line 42, in Claim 18, delete "COMA" and insert -- CDMA --, therefor.

In Column 16, Line 44, in Claim 18, delete "COMA" and insert -- CDMA --, therefor.

In Column 16, Line 46, in Claim 18, delete "COMA" and insert -- CDMA --, therefor.

In Column 16, Line 49, in Claim 18, delete "COMA" and insert -- CDMA --, therefor.

In Column 17, Line 30, in Claim 25, insert -- , --, before "wherein".

UNITED STATES PATENT AND TRADEMARK OFFICE
CERTIFICATE OF CORRECTION

PATENT NO.        : 7,403,505 B2
APPLICATION NO. : 10/334500
DATED             : July 22, 2008
INVENTOR(S)       : Yoon et al.

It is certified that error appears in the above-identified patent and that said Letters Patent is hereby corrected as shown below:

In Column 18, Line 1, in Claim 32, delete "more" before "two or more".

Signed and Sealed this

Eleventh Day of August, 2009

David J. Kappos
*Director of the United States Patent and Trademark Office*